United States Patent [19]

Kruder

[11] 4,356,140
[45] Oct. 26, 1982

[54] EXTRUSION METHOD WITH SHORT CYCLE MULTICHANNEL WAVE SCREW

[75] Inventor: George A. Kruder, Marion, Ohio

[73] Assignee: HPM Corporation, Mount Gilead, Ohio

[21] Appl. No.: 231,309

[22] Filed: Feb. 4, 1981

Related U.S. Application Data

[60] Division of Ser. No. 27,468, Apr. 5, 1979, Pat. No. 4,277,182, which is a continuation-in-part of Ser. No. 917,204, Jun. 20, 1978, Pat. No. 4,173,417, which is a continuation-in-part of Ser. No. 788,028, Apr. 15, 1977, abandoned.

[30] Foreign Application Priority Data

May 31, 1978 [GB] United Kingdom ............... 26000/78

[51] Int. Cl.$^3$ .............................................. B28B 3/20
[52] U.S. Cl. .................... 264/176 R; 264/349
[58] Field of Search ................. 425/208, 205; 366/89, 366/323; 264/349, 176 R

[56] References Cited

U.S. PATENT DOCUMENTS

| | | | |
|---|---|---|---|
| 3,858,856 | 1/1975 | Hsu | 425/208 |
| 3,870,284 | 3/1975 | Kruder | 425/208 |
| 4,015,832 | 4/1977 | Kruder | 425/208 |
| 4,128,341 | 12/1978 | Hsu | 425/208 |
| 4,173,417 | 11/1979 | Kruder | 425/208 |
| 4,285,600 | 8/1981 | Kruder | 425/208 |

Primary Examiner—Jay H. Woo
Attorney, Agent, or Firm—Gust, Irish, Jeffers & Hoffman

[57] ABSTRACT

An extruder having a multichannel wave screw is disclosed wherein at least one portion of the screw is provided with a helical passage that is divided into a pair of parallel flow channels. The helical passage is defined by a helical conveying land which extends radially outwardly to a first diameter from the screw root, which defines the bottom surface of the helical passage. To divide the helical passage into the pair of flow channels, a helical barrier land extends radially outwardly to a second diameter which is less than the first diameter. Each flow channel is further characterized by the existence of an undulating screw root which defines a plurality of waves, each with a crest and a valley. The crests of one flow channel are helically displaced relative to the crests of the adjacent flow channel. In addition, the difference between the second diameter and the first diameter is selected such that plasticated synthetic resinous material may flow from one flow channel into the other flow channel while unplasticated particles are subjected to intensive shearing forces by the crests of the respective flow channels. The wave cycle of each flow channel, defined as the distance between successive crests, is relatively short, eg. less than about 360° along each channel (i.e., less than about one full screw turn). Preferably, the wave crests are positioned 180° apart along the channel.

2 Claims, 9 Drawing Figures

EXTRUSION METHOD WITH SHORT CYCLE MULTICHANNEL WAVE SCREW

CROSS REFERENCE TO RELATED APPLICATIONS

This is a division of application Ser. No. 27,468 filed Apr. 5, 1979, now U.S. Pat. No. 4,277,182, which is a continuation-in-part of application 917,204 filed June 20, 1978, now U.S. Pat. No. 4,173,417, which is a continuation-in-part of application 788,028 filed Apr. 15, 1977, now abandoned.

BACKGROUND OF THE INVENTION

The present invention relates generally to extrusion devices for plasticating synthetic resinous material. More particularly, the present invention concerns an improved screw for use in connection with such extrusion devices.

With extrusion devices, there has been much interest in obtaining improved mixing of the plasticated material which is extruded. Poor mixing can be the cause of visual imperfections, fluctuating pressure in the material upstream of an extrusion die, temperature excursions in the material and similar phenomena. Moreover, good mixing reduces the amount of unmelted particles which may ultimately reach and partially block a screen frequently used in extruders upstream of the die.

While increasing the rate of energy input to the material can be effected by increasing the rotational rate of the extruder screw, there is an associated increase in temperature of material and localized variations in temperature. Since typical synthetic resinous materials are susceptible to degradation at high temperatures, merely increasing the rotational rate is not a satisfactory solution. Furthermore, the output is almost proportional to the rotational rate, so the energy input per pound of material processed only changes to a minor degree.

Satisfactory mixing of the processed material is of vital importance in most extruding operations, but the quality of mixing is not directly improved by increasing the energy input. What are important to achieve proper mixing are motions which enhance dispersion and distribution of one or more additive ingredients or which homogenize the melt and make the temperature of the melt uniform.

In one effort to reduce the number of unplasticated particles in an extrusion device, a wide intermediate screw flight has been used in conjunction with a helical channel, as disclosed in U.S. Pat. No. 3,701,512. In that device, however, the wide intermediate flight has a substantial width in order to apply a high level of shearing forces to all the material traversing the intermediate flight. Thus, all material, plasticated as well as unplasticated, is subjected to intensive shearing forces. This approach is unsatisfactory in that it unduly increases the temperature of the plasticated material because of the increased mechanical working thereof, and does not promote temperature uniformity in a satisfactory manner.

From an economic standpoint, it is normally desirable to maintain the extruder length as short as possible but yet achieve proper melting and mixing of the material. Extruder length is especially important in multistage extruders wherein the stages are separated by vents to remove volatile materials.

One effort to avoid some of the problems discussed above is disclosed in U.S. Pat. Nos. 3,870,284 and 4,015,832 issued to the assignee of the present invention. In the apparatus disclosed in these patents, an extruder screw is provided with a helical channel having an undulating depth which enhances the mixing characteristics of the extruder screw while providing highly satisfactory pumping or metering characteristics.

SUMMARY OF THE INVENTION

In accordance with the present invention, an extruder screw having a helical conveying flight is provided with a helical barrier land therewithin to form a pair of parallel helical flow channels. Each flow channel has an undulating bottom surface and includes repeating wave cycles. Each wave cycle is of varying depth, having relatively rapidly alternating wave crests and valleys. Typically, each wave cycle extends for an angular distance of 360° or less, preferably 180°, along the flow channel.

The wave cycles of the adjacent channels are helically offset so that a wave crest of one channel lies opposite a valley in the adjacent channel. The barrier land is undercut in a manner which facilitates the flow of melt thereacross from one channel to the other, while partially inhibiting the flow thereacross of unmelted solids. More concentrated solids thus tend to pass through a restriction formed by the wave crest while the melt-rich fraction travels across the barrier flight into the adjacent channel. The melt is in hydraulic communication across the undercut, thereby minimizing the formation of pressure pulses in the extrudate flow.

The width of the barrier flight is smaller than that of the conveying flight and, for example, may be less than eight percent (most preferably one to four percent) of the screw pitch or lead, which is the axial distance between points on the conveying flight exactly one revolution on the screw apart. The barrier flight is thus very narrow and imparts little energy input, i.e. heat, to the melt. The clearance above the barrier flight is dimensioned to minimize energy input to the melt, while inhibiting the passage of unmelted material thereacross.

Melting of the solids passing over each wave crest is maximized by dimensioning the wave crest restriction small enough to assure intensive working of the solids. The clearance between the wave crest and the wall of the surrounding barrel may, for example, be in the range of from about 0.03 to about 0.15 times the square root of the diameter of the barrel wall. The clearance between a valley and the barrel wall may be about 2 to about 6 times the clearance between a wave crest and the barrel wall.

The channel waves can be configured so that the combined cross-sectional area of both channels is non-uniform throughout a portion of each cycle. In addition, the cycle portions of decreasing depth can be helically longer than the portions of increasing depth, within a given channel. As a consequence, recirculation of melt and solids is intensified.

To reduce unbalanced pressure forces exerted on the screw by the material being plasticated in the wave screw section, an integral number of wave cycles are preferably provided for each turn of the flow channel.

BRIEF DESCRIPTION OF THE DRAWINGS

Many objects and advantages of the present invention will become apparent to those skilled in the art from this specification and the attached drawings wherein like numerals designate like elements and wherein.

DETAILED DESCRIPTION

Figure 1:
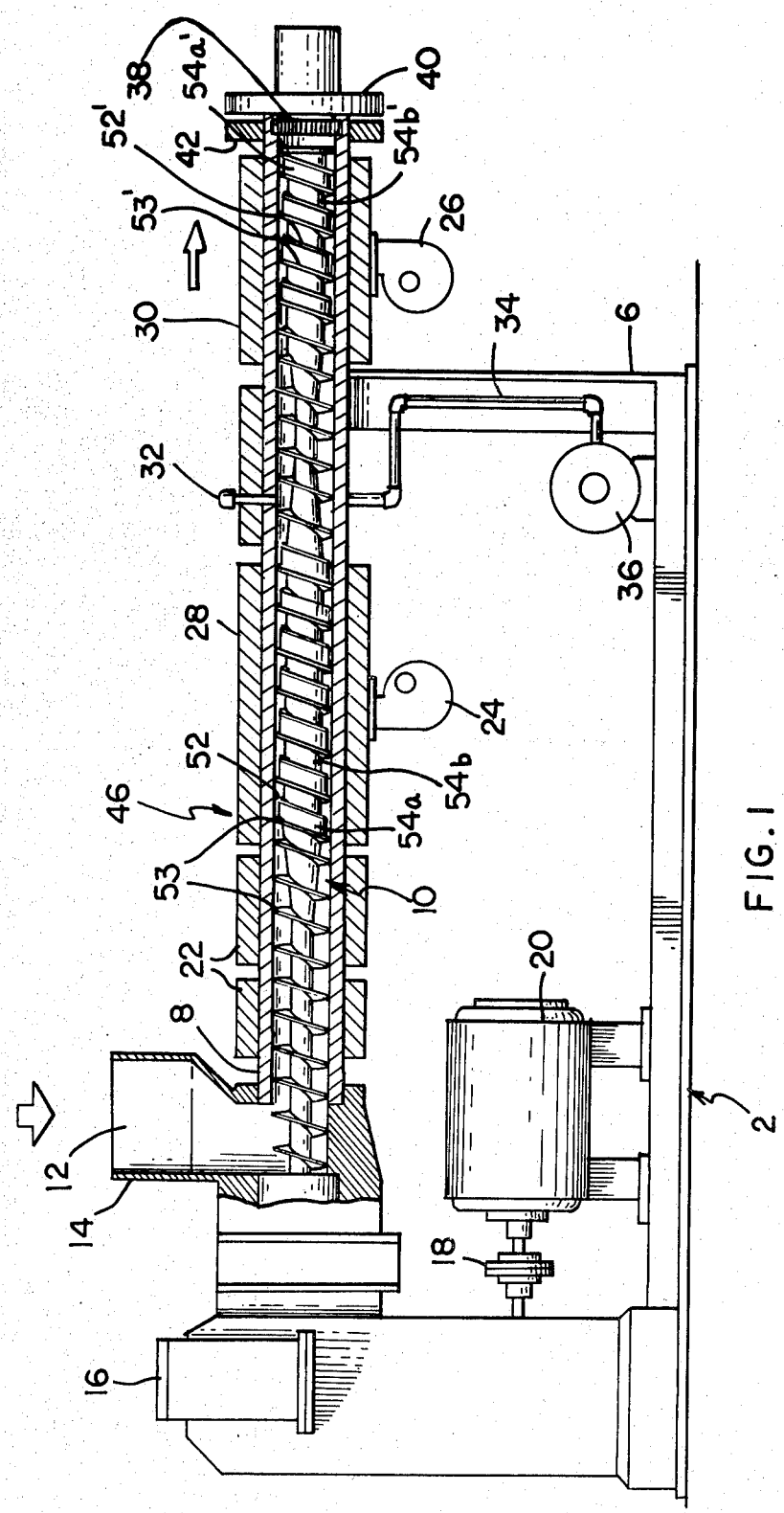
FIG. 1 is a side elevational view of a vented, two-stage extruding machine, with a portion of the barrel broken away to expose a screw according to the present invention.

Although the present invention is concerned particularly with the functioning of extruder screws, it will be helpful initially to consider generally the overall organization of a typical plasticating extruder machine. The machine shown in FIG. 1 includes frame 2 having upwardly extending portions 4 and 6 at its ends for supporting the actual extrusion components. These components include a horizontally extending barrel 8 and a screw 10 rotatably disposed within the barrel 8. At its rear end the barrel 8 communicates with a feed opening 12 extending upwardly through barrel 8 in front of stationary thrust housing 14. This feed opening 12 ordinarily receives material from a hopper overlying it.

The rear end of the screw 10 is mounted for rotation about an axis coincident with the axis of the cylindrical inner surface of the barrel 8 and is coupled to a speed reducer 16 carried by the left end upright 4 of the frame means. The speed reducer 16 is connected by gear means (not shown) and by a flexible coupling 18 to a motor 20.

Temperature control means 22 are associated with the barrel 8 of the extruder to supply heat to and/or remove heat from the material being processed. Such means are conventional, and, as indicated in FIG. 1, they may advantageously be located near the feed end of the barrel to so regulate the barrel temperature as to achieve efficient melting of the polymer being fed through the barrel. Air blowers 24 and 26 or, alternatively, liquid pumps also may be provided to force fluid through chambers 28 and 30 surrounding downstream portions of the barrel. The flowing fluid in these zones ordinarily is employed to remove heat from the barrel so as to prevent excessive temperatures and also to optimize the shear action upon the melt film at the barrel wall.

The barrel may be provided with a transverse opening 32 intermediate to its length. This opening 32 may be plugged in a conventional manner when the extruder is operated with a single shape screw, or it may be coupled by means 34 to a vacuum pump 36 to serve as a vent when the extruder is operated with a two stage screw 10 mounted within the barrel 8 as illustrated in FIG. 1.

A head clamp plate 38 is secured to the outer end of the extruder barrel 8 and provides support for a swing gate 40 or other adaptive support of conventional construction. The swing gate 40 has an internal channel for the extrudate, and in the more usual extrusion operations, dies are fixed to the swing gate to receive the extrudate passing through the opening therein.

A breaker plate 42 is shown in FIG. 1 as being fixed in position at the end of the barrel 8. Such a breaker plate 42 is basically a screen through which the polymer melt must pass in moving to the die. It normally prevents particles of impurities or solid polymer from entering the die.

The portions of the extruder which have been described above with reference to FIG. 1 of the drawings are well known to persons skilled in the art, and it will be recognized that numerous variations are possible. However, such variations are not particularly significant as far as the present invention is concerned, and they need not be referred to in detail here.

Figure 2:
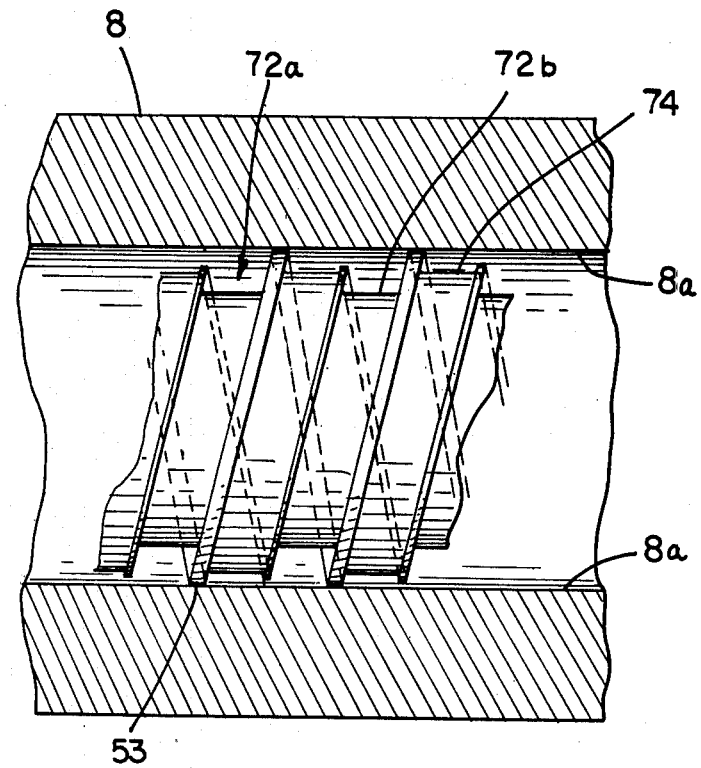
FIG. 2 is a fragmentary, side elevational view of the preferred form of one channel wave according to the present invention.

The screw 10 shown in FIGS. 1 and 2 are being positioned within the extruder barrel 8 is a relatively complex two stage screw especially suitable for the extrusion of styrene sheet. However, it will be understood that the present invention is also adaptable to single stage screws which omit the venting feature. It should be noted that the screws illustrated in the drawings have been axially compressed somewhat for ease of illustration. In practice, for a screw having a diameter of two and one-half inches a lead of three and one-half inches would be used.

Figure 3:
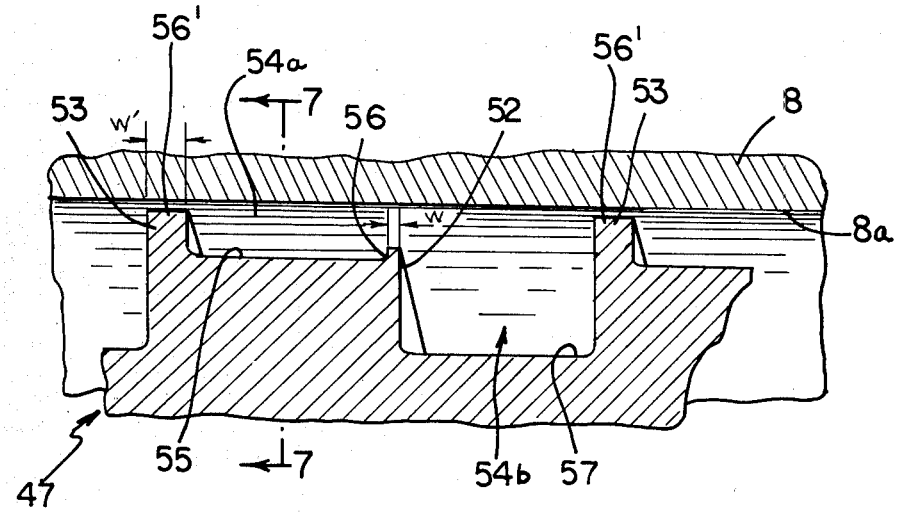
FIG. 3 is a fragmentary, longitudinal sectional view through an extruder screw according to the present invention.

In accordance with the present invention an extruder screw 47 includes a double channel wave screw section 46. The double channel wave section may serve primarily as a mixing section if used in series with a conventional constant depth meter section. Alternatively, a number of repeating double channel wave cycles can serve as the meter section alone, irrespective of whether the screw is a single or double stage or alternate scheme such as a "melt decompression" screw. One possible alternative is to use the quick cycle double wave section as a mixing section just prior to the die in front of a conventional constant depth metering section or a single or double wave metering section. A double channel wave metering section as depicted in FIG. 3, includes an undercut helical barrier land 52 disposed in the middle of a flow passage formed by the conveying land 53, of the screw and proceeds in parallel with the conveying land 53, so that the passage is divided into two adjacent flow channels 54A, 54B. The flow channels 54A, 54B travel in parallel alongside one another and then combine at the end of the screw. It will be appreciated that each flow channel is formed by the barrier land 52, the conveying land 53, and a corresponding surface 55, 57. The barrier land 52 is undercut relative to the conveying land 53, i.e. is of smaller radius, for reasons to be discussed.

Each of the channels 54A, 54B has a wavelike pattern. That is, the depth of each channel (i.e., the distance from the outer edge of the conveying flight to the channel base) varies so that wave crests are formed periodically along each channel. Each wave crest constitutes a channel section of restricted depth. Between the wave crests are disposed deeper valley portions. In FIG. 3 a crest portion of channel 54A and a valley portion of channel 54B are depicted. It will be realized that the wave crests are formed by a base surface portion of maximum radius, whereas the valleys are formed by a base surface portion of minimum radius. The adjacent channels 54A, 54B are arranged wherein the wave crests are offset helically, so that a wave crest of one channel lies adjacent a valley portion of the other channel. In this fashion, plasticated synthetic resinous material, or melt, can be effectively transferred across the barrier land from the passage containing the wave crest to the channel containing the valley.

The axial width W of the outer edge 56 of the barrier land 52 is substantially less than the axial width W' of the outer edge 56" of the conveying land 53. More particularly, the barrier land width may be less than eight percent of the conveying screw pitch (i.e., the axial advance of the conveying land is one 360° revolution of the screw) and most preferably lies within the range of from about one percent to four percent of that pitch. In this fashion, the barrier land is narrow, and little shearing action is imposed upon melt that is transferred across the barrier land, thereby avoiding excessive energy input, and thus heating the melt. This contributes significantly to the acceptable temperatures and temperature variances exhibited by the present invention.

Figure 7:
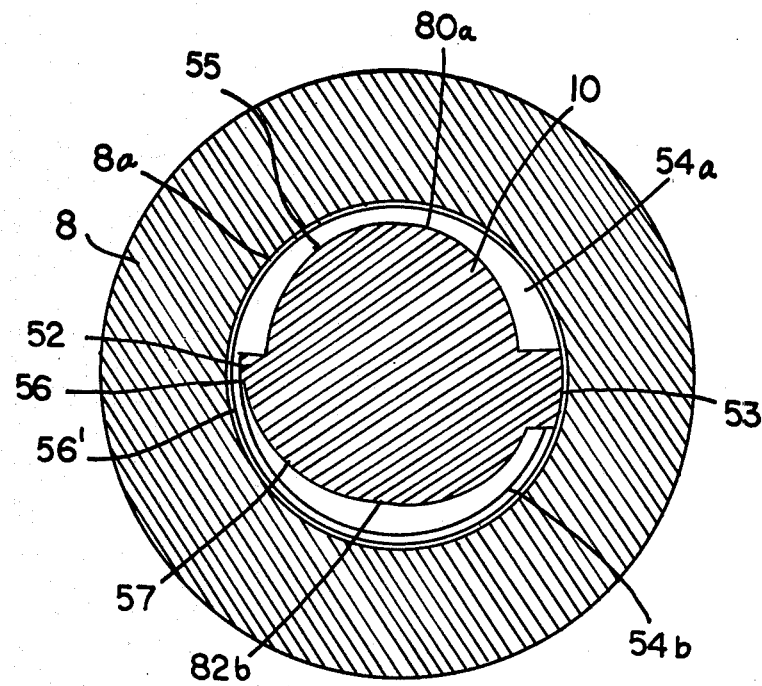
FIG. 7 is a cross sectional view taken along the line 7—7 of FIG. 3.

Turning now to FIG. 7, a cross-section through the screw 10 illustrates the existence of a maximum radius surface portion 80A of the surface 55 of the first flow channel 54A. Similarly, a minimum radius surface portion 82 of the surface 57 is illustrated in the second flow channel 54B. The preferred angular distance between maximum radius portions or wave crests is illustrated more clearly in FIGS. 8a and 8b.

Figure 8A:
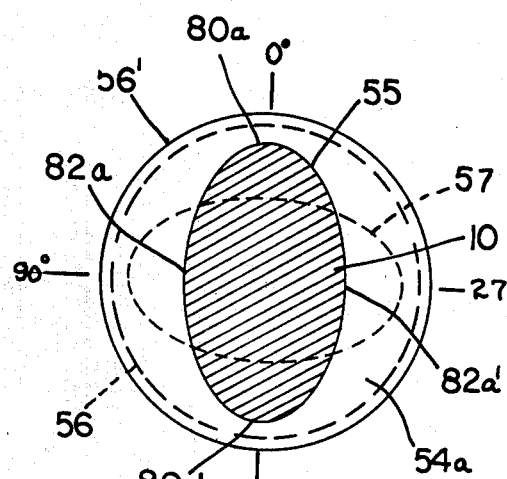
FIGS. 8a and 8b are schematic illustrations of the undulating screw root in the first flow channel and the adjacent flow channel, respectively.

FIG. 8a represents the radial variation of the surface portion 55 of flow channel 54A along the center of flow channel 54A through one 360° revolution about the axis of the screw 10. Accordingly, it will be seen that the surface 55 progresses from a wave crest, or maximum radius portion, at 80A to a minimum radius portion, or valley, at 82A in an angle of 90°, or one quarter turn, about the axis of the screw 10. During the second one quarter turn, progressing from 90° to 180°, the surface 55 progresses from the valley 82A to a second crest 80A'. A similar variation from the second wave crest 80A' to a second valley 82A' occurs during a subsequent 90° angle about the screw axis. Thus, it will be seen that for each 360° turn around the screw, the flow channel 54A passes through two wave cycles, each extending for 180°.

Figure 8B:
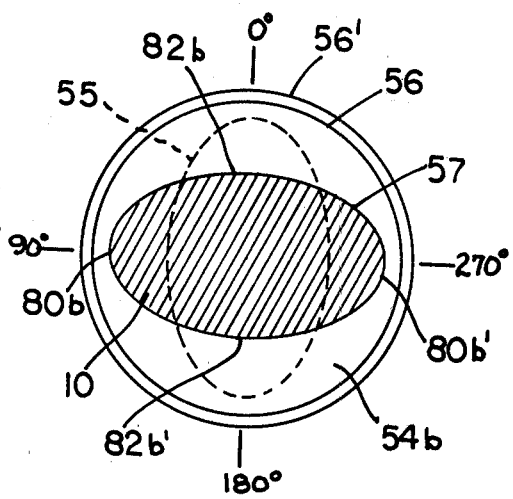

In FIG. 8b, the variation of the surface 57 in the second flow channel 54B is illustrated for the screw 10 in the same angular orientation as that illustrated in FIG. 8a. As with FIG. 8a, the surface 57 is depicted schematically for the center of the flow channel 54B through one 360° revolution about the screw axis. Thus, while at the 0° orientation the surface 55 has a crest at 80A in FIG. 8a, the surface 57 has a valley at 82B. While transversing a 90° angle around the screw, the surface 57 progresses from the valley 82B to a crest 80B. While progressing through a second 90° angle around the screw axis to the 180° position, the surface 57 recedes from the crest 80B to a valley 82B'. A similar variation occurs through the subsequent 180° angle about the screw axis.

It will thus be apparent that the second flow channel 54B also has a wave cycle that extends 180° about the axis of the screw and that the wave cycle of the second flow channel 54B is out of phase with the wave cycle of the first flow channel 54A. It will be noted that the radial variation between the valleys and crests, as depicted in FIGS. 8a and 8b, is exaggerated for purposes of explanation.

Preferably, each wave cycle extends helically along the screw for 360° or less along the corresponding flow channel (i.e., less than one full screw turn) but more than 120° along the corresponding flow channel. The 120° lower limit corresponds roughly to that frequency of wave cycles where the flow channels 54A, 54B provide considerably reduced or virtually no pumping action. Accordingly, if the multichannel wave screw portion is to function as a pump in the extruder screw, the wave cycle should be greater than about 120° in angular length. However, when used in series with a conventional constant depth meter section capable of developing adequate pressure to flow through the extrusion die, the 120° cycle waves can be very useful as a mixing section.

Preferably, the angular extent of the wave cycle provides an integral number of wave crests in each pitch length of the screw. In this fashion, the side forces exerted on the screw by material being plasticated may be balanced.

In the event that the multichannel wave screw portion is to provide merely a mixing function, the angular length of each wave cycle can be less than 120°. In this case, the crests provide a relatively great restriction to downstream movement of plasticated material.

It is preferred that there be several wave cycles in each flow channel to minimize pressure fluctuations at the screw tip. For example, four wave cycles in each flow channel has been found to be satisfactory for certain applications.

An integral number of wave cycles in each pitch of the screw is useful to shorten the required length of the wave screw section as compared with known designs. Such shortened length requirements permit the wave screw section to be used advantageously in multistage extrusion machines where each pumping stage is necessarily short.

The channel waves 54A, 54B may be formed in any suitable manner. For example, the waves may be of continuously varying depth (FIGS. 2,4), or of the so-called "flat bottom" type (FIGS. 5, 6), as will be discussed subsequently in detail.

A "flat bottom" channel 58 (FIGS. 5, 6) forms wave cycles each having a valley portion 60 of constant depth separated by protrusions 62, which include bottom surface portions 64, 66 of increasing and decreasing radius. A wave crest 68 is formed at the tip of each protrusion 62.

For one type of flat-bottom waves, each protrusion 60 may occupy one-third of its associated cycle, with the valley portion occupying the remaining two-thirds.

Figure 5:
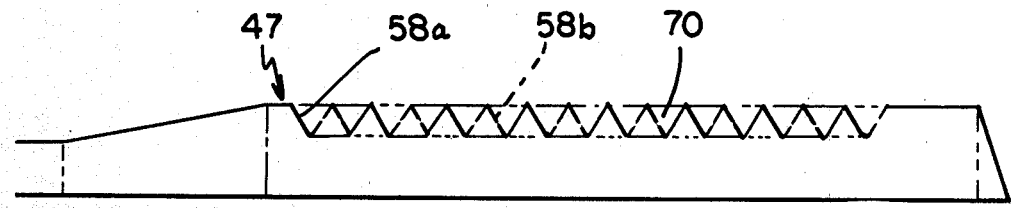
FIG. 5 is a schematic, diagrammatical view of another preferred form of channel wave pattern.

The adjacent flat bottom flow channels 58A, 58B are arranged so that a wave crest 68 of one channel lies next to a valley portion 60 of the adjacent channel, as depicted schematically in FIG. 5. Immediately preceeding and following each protrusion in a cycle there occurs a short extent 70 of a valley (one-sixth of a cycle) which lies next to a valley portion of the adjacent channel.

It will be realized that the combined cross-sectional area of the channels 58A, 58B, i.e., the cross-section across the helical passage formed by the conveying land 53, is not constant throughout an entire wave cycle for flat-bottom waves. Rather, such cross-sectional area varies axially, except in those regions 70 immediately following and preceeding each protrusion.

It has been found that the provision of wave channels whose combined cross-sectional area are non-constant serves to maximize the complexity of sequential flow pattern changes within and between channels 58A, 58B which augments the melting and mixing actions.

The wave crests are dimensioned so that the channel restriction formed thereby imparts maximum shearing action to solid material. The height of such restriction may approximate the thickness of individual particles P. Often times, channel depth can be even less than particle thickness since many types of heated compressed pellets are easily deformed. The particles approach the wave crest and are worked between the protrusion and the inner barrel surface 8A. The ensuing energy input serves to heat and melt the solid. Flow of melt, which ordinarily would be partially blocked as particles pass through the restriction, is able to transfer to the adjacent valley through the annular space between the barrier land 52 and the barrel surface 8A.

In order to achieve optimum heating and melting of the particles, the clearance between the wave crest and barrel surface 8A may lie within a range from about 0.03 to about 0.15 times the square root of the barrel inner diameter. This assures that the particles are amply worked in shear to promote heating and melting.

The clearance between a valley portion of each wave cycle (i.e., a base surface portion of minimum radius) and the barrel surface may lie in the range of from about 2.5 to 5 times the clearance between a wave crest (i.e., a base surface portion of maximum radius) and the barrel surface.

The magnitude of the clearance between the barrier flight 52 and the barrel surface 8A is determined so as to facilitate flow of melt across the barrier land 52 with minimum shear while minimizing the transfer of solid thereacross. It has been found, for example, that in a 2.5 in. diameter screw, a clearance in the range of from about 0.040 to 0.080 in. with a narrow barrier width, easily achieves this object. A typical range for the barrier clearance is from about 40% to about 100% of the wave crest clearance. Optimum barrier clearance is less for low viscosity melts than for high viscosity melts.

For larger screw diameters this range changes approximately in direct proportion to the diameter ratio to the 0.7 power, i.e., a range of clearance for a 4.5 in. diameter screw can be found by the formula:

$$\text{Clearance} = 0.040 \text{ [or 0.080]} \times \frac{(4.5)}{2.5} 0.7$$

It may be desirable to progressively vary the height of some wave crests within each channel. That is, one or more of the initial wave crests in a channel would have greater clearance than that of the downstream wave crests in the channel. In this connection, it has been found that the quantity of unmelted particles P gradually decreases in a downstream direction as melting progresses. Thus, larger clearance at the earlier protrusion would accommodate larger concentrations of particles occurring there. As the concentrations become diminished with increasing melting action, the downstream clearances can be smaller. Consequently, an unduly large back-up is avoided. Preferably, the protrusions of the channels are oriented so that forces generated by the interaction between flowing extrudate and the protrusions are balanced along the screw.

Figure 4:
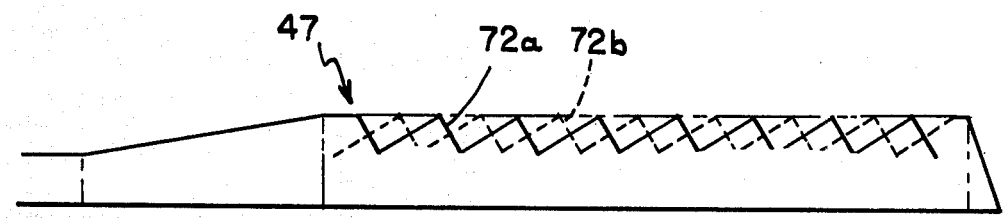
FIG. 4 is a schematic diagrammatical view of the channel wave pattern depicted in FIG. 2.

Wave channels 72A, 72B of continuously varying depth are depicted in FIGS. 2, 4. These channels are each of progressively increasing and decreasing radius, thereby providing a continuously varying channel depth. Where enhanced mixing is to be achieved with only moderate pressure development required, each wave in a single screw is preferably completed over less than about 360 degrees of the helical channel and there are at least four cycles in each channel. In a two stage screw each wave can be completed over a short helical extent. This may be important to leave sufficient length for a conventional constant depth metering section in series where needed to develop adequate die pressure. The regions of greater radial dimension along the base surface of each channel define wave crests 74. The regions of smallest radial dimension form valleys 76. The wave crests of adjacent channels are offset in the helical direction so that each wave crest lies alongside a deeper channel portion of the adjacent channel.

For extruding some polymer materials it is preferable that the portion of each wave which is of increasing radius occupies more than one-half of the wave cycle and is thus longer than the portion of decreasing radius, as depicted diagrammatically in FIG. 4. Accordingly, the unmelted particles approach each wave crest relatively gradually, and then descend in a more rapid fashion. This asymmetrical relationship of each wave provides a gradual, extended zone for the melt to transfer to the adjacent channel, and generates an intensive recirculation and intermixing of melt and solid downstream of the wave crest.

Figure 6:
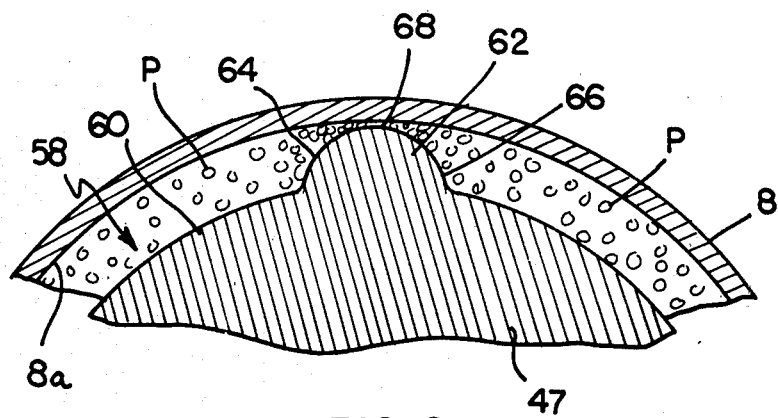
FIG. 6 is a partial cross-sectional view through a screw and barrel, depicting the channel wave illustrated in FIG. 5.

In other aspects, these wave channels are similar to the flat bottom waves described in connection with FIGS. 5, 6. That is, the combined cross-sectional area of the channels 72A, 72B varies throughout a wave cycle. The wave crests are dimensioned so as to provide restrictions in range from about 0.03 to about 0.15 times the square root of the barrel diameter. The wave crest restrictions can be progressively increased in height in a downstream direction.

The pitch of the conveying screw flight in the disclosed embodiments may be such that the axial advance of each flight in each 360 degrees about the screw axis is in the range of from about 1.25 to about 1.50 times the diameter described by the outer surface of the conveying flight.

In cases where a two stage, vented screw is employed, that portion of the screw disposed opposite the vent, is of single channel or twin channel, non-wave construction, to avoid displacement of extrudate through the vent.

Moreover, as a general proposition, the multichannel wave screw section should be located within the extrusion device at an axial position where polymer material has been sufficiently plasticated that there exists enough plasticated melt to pass over the helical barrier land and avoid excessive blockage by the unmelted particles at wave crests.

OPERATION

Extrudate flow is divided between the channels 54A, 54B (FIG. 3) as it enters the multichannel wave screw section. The melt and solid in one of the channels eventually approaches the first wave crest.

In the absence of an undercut barrier flight, all of the melt and solid would have to pass through the restriction at each wave crest. Consequently, at the first few wave crests the particles squeezing through the restriction tend to exhibit rapidly varying partial blockage of the liquid path. Since there would be no way for the liquid melt to communicate with an alternative flow path, small and rapid hydraulic pressure pulses would probably take place in the first few waves in situations where mwlting is fairly incomplete. This can result in varying output pressure and speed at the screw tip.

By contrast, in the twin channel wave screw having an undercut barrier flight, the melt approaching the wave crests is in communication with an adjacent deeper channel across the undercut barrier. Since significant amounts of the surrounding melt can thus transfer to this deeper channel region, the formation of pressure pulses is minimized. Moreover, by removing melt from the channel, the particles are able to wedge up into each wave crest restriction more easily. This assures more rapid melting of the particles jammed into the wave crests. In practice, then, the wave crests for twin channel wave screws having an undercut barrier can be made more restrictive than those of single channel wave screws. Results obtained during experimentation show that the twin channel wave screw can produce faster melting and greater flow stability than single channel wave screws. Furthermore, a single design can give outstanding performance with a wide range of polymers.

In accordance with the present invention these advantages are achieved without excessive heating of the melt. The narrow configuration of the barrier flight imparts minimal energy input, and thus minimal heat, to the melt. Therefore, the melt passes across the undercut barrier with minimal heat input and, in so doing avoids travel through the wave crest restriction and the heat input which would accompany such travel. The clearance between the barrier flight and the barrel promotes the transfer of melt while resisting transfer of particles. Accordingly, the temperature, as well as temperature fluctuations of the melt at the screw outlet are maintained within an acceptable range. Extruder screws having more than one barrier so as to provide three or more wave channels are also contemplated within the scope of the present application.

The wave crest restrictions are maintained sufficiently shallow to assure that intensive shearing and heating of solid particles occurs.

By maintaining a non-uniform cross-sectional area across the conveying flight throughout a substantial extent of the wave cycle, the mixing action is intensified.

Intensive mixing action also takes place as a result of the arrangement wherein the wave portion of increasing radius is longer than the portion of decreasing radius.

An important advantage of the rapid cycle wave length (i.e., less than about 360 degrees) resides in the ability to provide a shorter section of the screw which gives better product uniformity (temperatures, pressures, and mixture) and higher material output than previously available extrusion screw designs.

Moreover, the enhanced mixing obtained with this screw design is effective to uniformly mix additives, such as pigments, glass fibers and the like with the plasticated material.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A method of extruding synthetic resinous material at high but steady throughput rate, without overheating and with good melt quality, comprising processing resinous material in a first zone to melt most of the material and advance it to a mixing zone, dividing the flow through said mixing zone into two parallel channels each of which has restricted cross-sectional areas at a plurality of locations along its length and with the restricted areas in one channel being longitudinally offset from the restricted areas in the other channel and with the cross-sectional area of each channel varying cyclically over at least four substantially identical cycles, the restricted cross-sectional areas being areas of decreasing channel depth terminating at the respective channel depth crests, forcing incompletely melted resinous material in each of the channels to pass through the restricted areas in that channel to receive extra energy input for melting the same throughly, and filtering a portion of the completely molten resinous material form one channel to the other across a narrow helical barrier flight with a minimum energy input just in advance of each of the restricted areas to avoid the extra energy input associated with passage through the restricted areas and thereby to avoid overheating of the melted material, the cycles reinforcing one another and collectively providing a steady material flow rate and pressure at the output end of the mixing zone, the improvement wherein channel depth crests occur with a frequency along the respective channel greater than once per pitch length of the screw and molten material is filtered across the barrier flight separating the two channels more than twice per pitch length of the screw.

2. The method of claim 1 wherein the resinous material flows along a portion in each channel having substantially constant depth between the restricted cross-sectional areas.

* * * * *